US012661854B2

(12) United States Patent
Debat et al.

(10) Patent No.: US 12,661,854 B2
(45) Date of Patent: Jun. 23, 2026

(54) METHOD FOR PRODUCING A DECORATIVE OBJECT FROM AT LEAST ONE EXTRUDED BEAD LAYER

(71) Applicant: BLACHERE ILLUMINATION, Apt (FR)

(72) Inventors: Benjamin Debat, Apt (FR); Dorian Fabre, Apt (FR)

(73) Assignee: BLACHERE ILLUMINATION, Apt (FR)

( * ) Notice: Subject to any disclaimer, the term of this patent is extended or adjusted under 35 U.S.C. 154(b) by 74 days.

(21) Appl. No.: 18/847,877

(22) PCT Filed: Mar. 14, 2023

(86) PCT No.: PCT/EP2023/056494
§ 371 (c)(1),
(2) Date: Sep. 17, 2024

(87) PCT Pub. No.: WO2023/174944
PCT Pub. Date: Sep. 21, 2023

(65) Prior Publication Data

US 2025/0205972 A1 Jun. 26, 2025

(30) Foreign Application Priority Data

Mar. 17, 2022 (FR) ....................................... 2202347

(51) Int. Cl.
*B29C 64/393* (2017.01)
*B29C 64/118* (2017.01)
(Continued)

(52) U.S. Cl.
CPC .......... *B29C 64/393* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS

2020/0130283 A1* 4/2020 Achten ................ B29C 64/118

FOREIGN PATENT DOCUMENTS

FR 3069800 A1 2/2019

OTHER PUBLICATIONS

International Search Report issued Jun. 20, 2023, in International Patent Application No. PCT/EP2023/056494, 12 pages.

* cited by examiner

*Primary Examiner* — Virak Nguon
(74) *Attorney, Agent, or Firm* — Maier & Maier, PLLC

(57) ABSTRACT

A method for producing a decorative object from at least one extruded bead layer, including a step of passing a polymer-based composition into an extrusion die, the extrusion head controlled by a control element to follow a continuous trajectory intended to form the decorative object in one layer, the control element controlling a variation in the speed V of movement of the extrusion head on the basis of a variation in the trajectory of the extrusion head by an angle α and, at a distance D from a change in angle α, the continuous trajectory of the extrusion head complies with the following equation, for each of the layers forming the decorative object, where appropriate: $D=a+(b\times V^{c})+(d\times\alpha)$ where a, b, c and d are constants.

10 Claims, 5 Drawing Sheets

(51) Int. Cl.
*B29C 64/209* (2017.01)
*B29L 31/00* (2006.01)
*B33Y 10/00* (2015.01)
*B33Y 50/02* (2015.01)

(52) U.S. Cl.
CPC ............... *B33Y 10/00* (2014.12); *B33Y 50/02* (2014.12); *B29L 2031/722* (2013.01)

[Fig. 1]
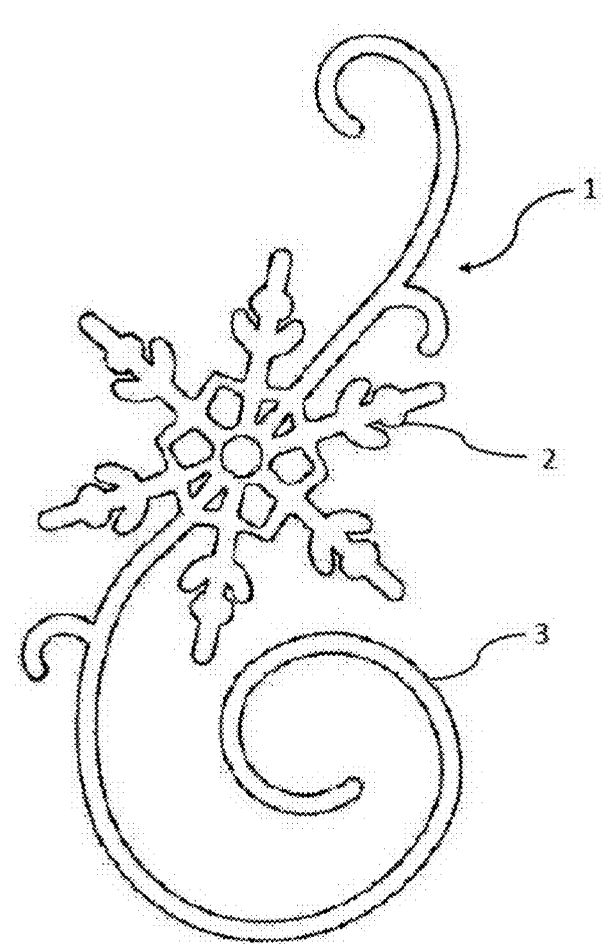

[Fig. 2]
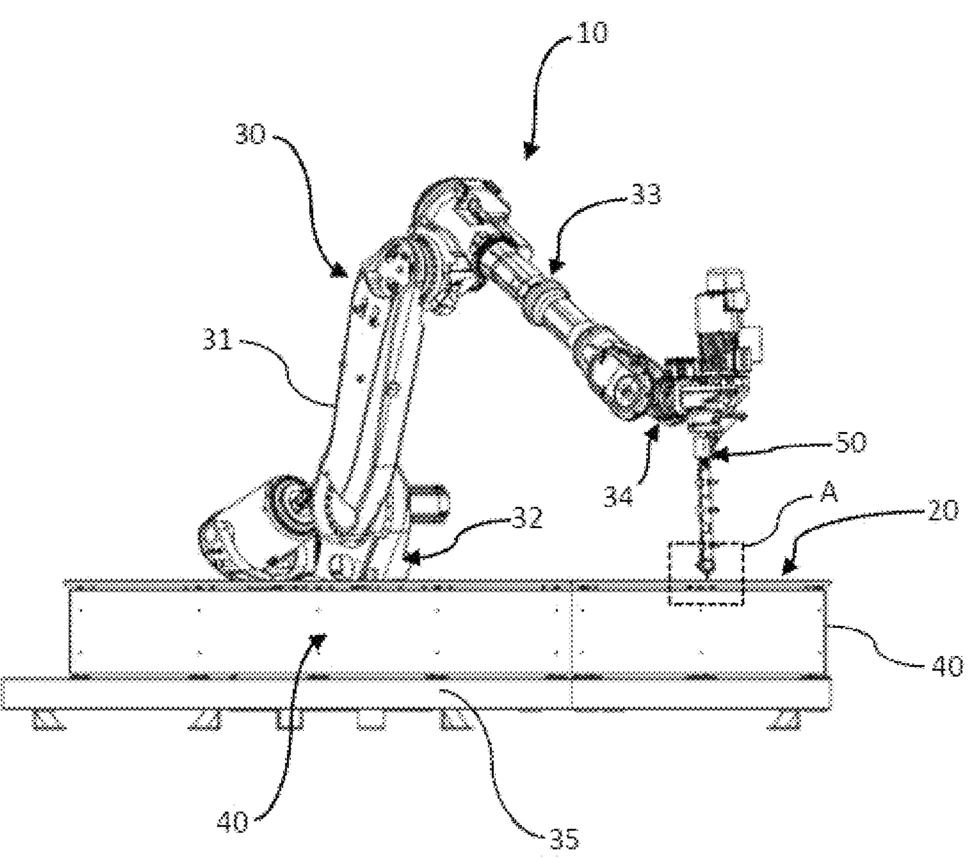
[Fig. 3]
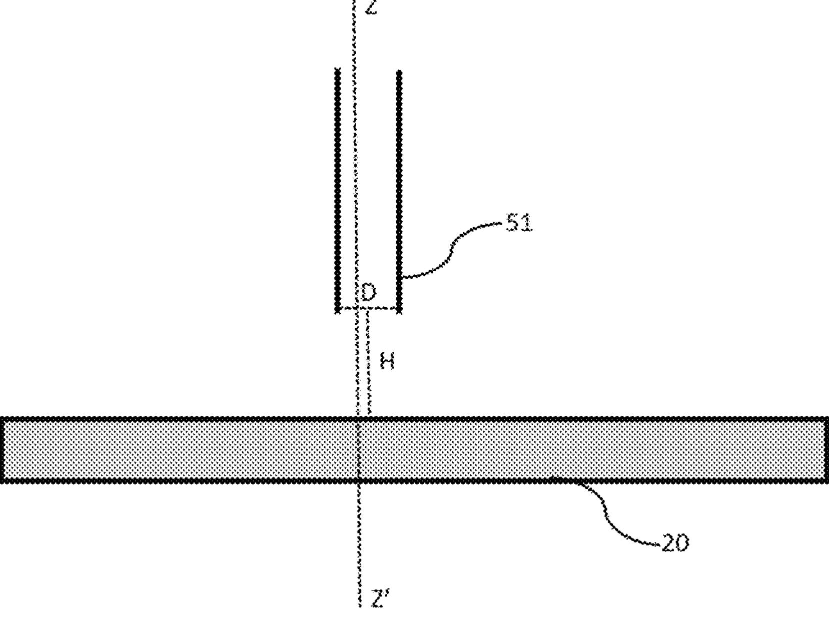

[Fig. 4]
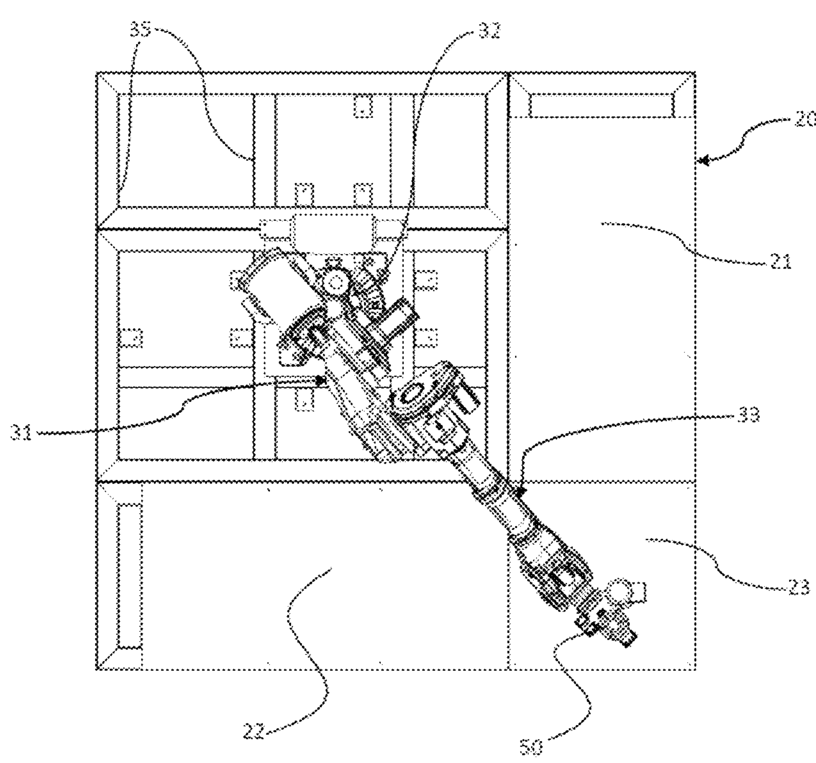
[Fig. 5]
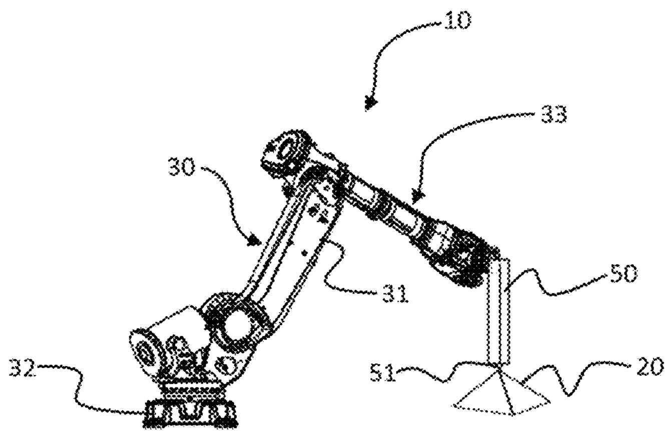

[Fig. 6]
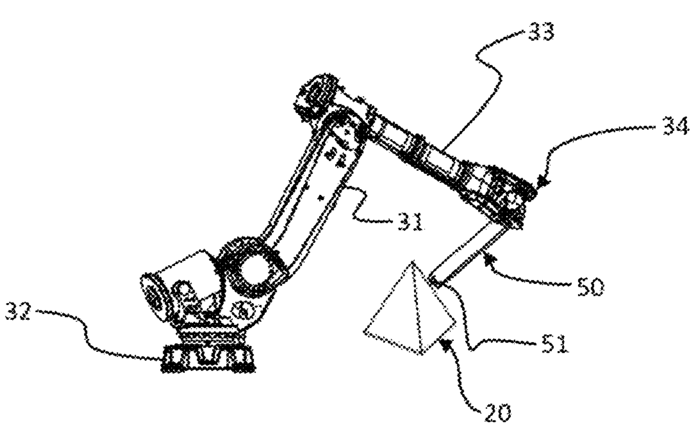
[Fig. 7]
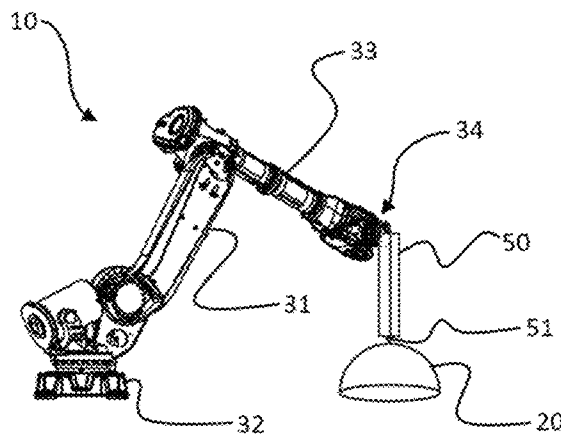
[Fig. 8]
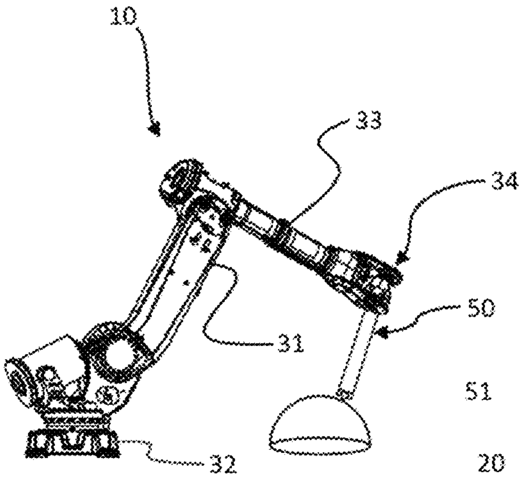

[Fig. 9]
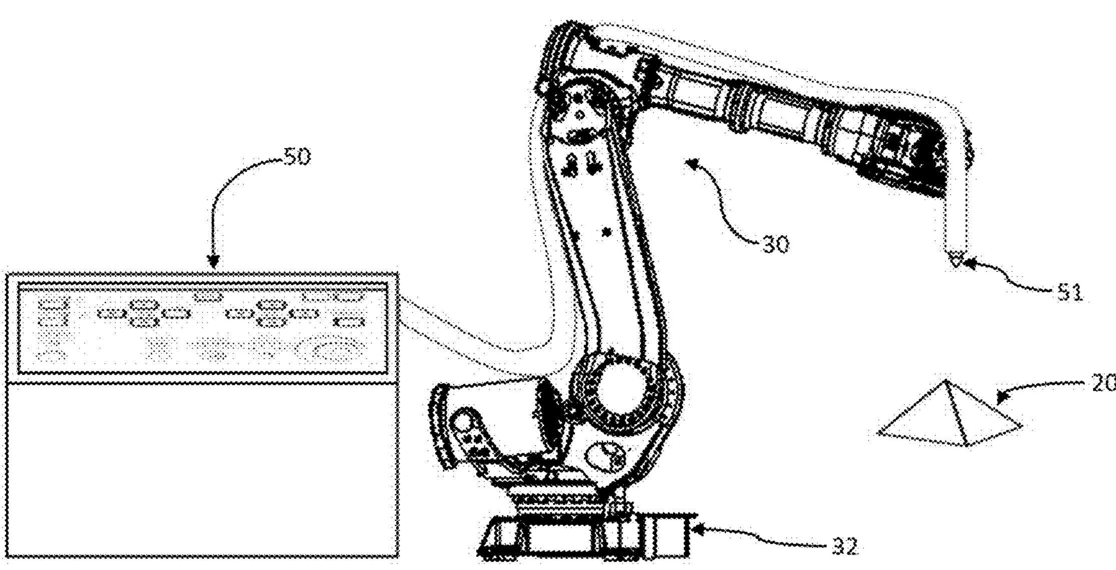
[Fig. 10]
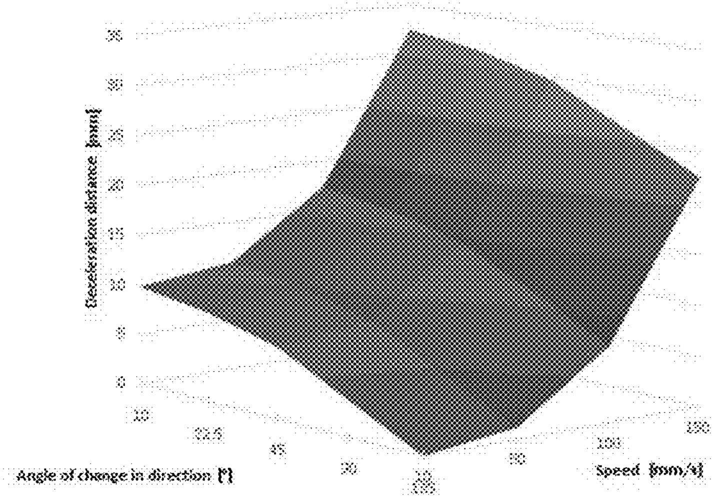

METHOD FOR PRODUCING A DECORATIVE OBJECT FROM AT LEAST ONE EXTRUDED BEAD LAYER

TECHNICAL FIELD

The invention relates to a method for producing a decorative object from at least one extruded bead layer. The term decorative object refers to an object whose sole function is ornamental, for indoor or outdoor use.

The invention relates in particular, but not exclusively, to the technical field of temporary or permanent light decorations, and more specifically to light decorations located outdoors, such as those set up traditionally for celebrations or other events. The invention may also find many other applications, for example in the field of advertising decorations or for decorating store window displays.

Background

Decorative objects, such as light decors, are usually produced from an aluminum frame on which one or more string lights, generally formed from a succession of LEDs, are secured.

In patent documents FR 2796446 and FR 3069800, held by the applicant, this string light support frame is partly produced by plastic injection-extrusion.

Thus, such decorative objects, in that they have to attach or hold lights in the form of string lights or other decorative elements, require a partial or total frame made of a mechanically resistant material. In general, this material acting as a frame for supporting lights or the like consists of aluminum because this material is light while being mechanically resistant.

Nevertheless, such decorative objects are complex to produce because they require two separate steps, a first step of producing the metallic frame and a second step of molding a plastic on all or part of the metallic frame, to house the lights and/or to form an original shape.

Decorative objects entirely made of plastic are currently known, but these objects are made of extruded beads having a very large thickness or diameter, of the order of at least three centimeters in thickness or diameter.

To date, attempts to produce decorative objects with thinner extruded beads have led to reserving the use of a very small number of polymers, not necessarily having advantageous properties for the present use, at the risk of processability problems in the extrusion die and/or degraded mechanical properties.

Moreover, producing a decorative object with complex shapes is not currently possible unless it is planned to produce a layer of polymer-based composition discontinuously, by forming each complex part of each of the layers of the decorative pattern in pieces.

Thus, there is currently no method capable of continuously producing a polymer layer—or each of the layers—of a decorative object with complex shapes. Obviously, this decorative object must be obtained with the best possible quality.

The present invention intends to remedy this situation.

An aim of the present invention is that of remedying the drawbacks of existing methods by defining a process capable of producing a decorative object from extruded beads—obtained from a wide range of polymers including those intrinsically having the best properties/qualities—continuously, the extruded polymer beads having on each part, even complex, of said object the same thickness.

Such a method makes it possible to reduce the time for producing a decorative object very significantly, this object having a constant thickness or diameter while having a stable structure (with no occasional overthickness or underthickness) and sufficiently mechanically resistant in view of the uses of the decorative object.

Indeed, this decorative object is intended to be set up preferably outdoors, regardless of the surrounding conditions.

Another essential aim of the invention consists of providing an economical and reliable production method, i.e. allowing perfect reproducibility of the decorative object as many times as desired.

Summary

After multiple trials and attempts, the applicant has developed a method for producing a decorative object, manufactured economically (saving time and implementation means) and of perfect quality (in particular without any defects), including at least one extruded bead layer having a constant thickness or diameter.

The thickness or the diameter of the decorative object is between four and nine millimeters, advantageously between six and eight millimeters, and very advantageously an extruded bead layer of a thickness or diameter of seven millimeters.

When the bead comes out of the extrusion head, it has a circular cross-section but after it is deposited on the receiving support, the extruded bead flattens to ultimately have a thickness (or diameter) greater than its height, according to the data presented above.

The solution as proposed by the invention is a method for producing a decorative object from at least one layer of an extruded bead of a polymer-based composition, including a step of passing a polymer-based composition into an extrusion die from a feed inlet of said composition to an extrusion head from which an extruded bead of said composition comes out, the extrusion bead being deposited on a receiving support by gravitational effect.

The method according to the invention is characterized in that the extrusion head is controlled by control means to follow a continuous trajectory intended to form said decorative object in one layer, said control means controlling a variation in the speed V of movement of the extrusion head on the basis of a variation in the trajectory of the extrusion head by an angle α and, at a distance D from a change in angle α, the continuous trajectory of the extrusion head complies with the following equation, for each of the layers forming the decorative object, where appropriate:

$$D = a + (b \times V^{c}) + (d \times \alpha)$$

where a, b, c and d are constants according to the following values $a$=10.6±10%

$b$=2.76$^{-05}$±10%

$c$=2.72±10%

$d$=−0.08±10%

Where D is expressed in millimeters, V in millimeters per second (m·s$^{-1}$) and α in degrees.

The expression "decorative object" means an object for which the intended purpose is the esthetic decoration of an indoor or outdoor location. Obviously, this decorative object may be combined with one or more other visual elements such as for example string lights or lights and in this case the decorative object may serve as, or have the function of, a support for these elements combined with the decorative object.

Thanks to this precise configuration of the acceleration/deceleration of the extrusion head, on the basis of the speed at a given time as well as a future change in angle to follow the pattern of the decorative object, regardless of the chemical nature of the polymer composition, or practically regardless of this chemical nature of said composition, the extruded bead is produced automatically continuously, with a constant diameter/thickness, such that the production process is particularly easy and saves very significant time.

A representation of this equation can be seen in FIG. 10.

Thus, extruded beads, and finally a decorative object, are obtained, having optimum mechanical properties and physicochemical properties for the varied uses, in an often very harsh setting, envisaged for the decorative object.

Also thanks to the method according to the invention, the process for producing a decorative object is automated so as to remove, or at the very least reduce, labor, while producing a quality decorative object very rapidly.

It should be noted here that the expression "gravitational effect" regarding the extruded bead refers to the fact that the movement of the extruded bead, from its outlet from the extrusion head to the receiving support, is constrained or directed only by the weight of said bead. This effect is enabled in particular in that the extrusion die is disposed or oriented vertically, in other words in the direction of application of the gravitational force. Obviously, it is also necessary to consider the thrust exerted by the extrusion die on the extruded bead, in order words the kinetic energy of the latter at the outlet of the extrusion head, and this force or this kinetic energy may optionally also be oriented in the direction of the gravitational force. Indeed, this force resulting from the thrust exerted by the die is oriented with a different angle from the gravitational force when the receiving support is in relief.

Further advantageous features of the invention are listed below. Each of these features may be considered alone or in combination with the remarkable features defined above. Each of these features contributes, where applicable, to solving specific technical problems defined earlier in the description and in which the remarkable features defined above are not necessarily involved. The latter may, where applicable, be the subject of one or more divisional patents:

Preferably, the constants a, b, c and d are expressed according to the following values $$a=10.6\pm5\%$$

$$b=2.76-05\pm5\%$$

$$c=2.72\pm5\%$$

$$d=-0.08\pm5\%$$

According to an advantageous aspect of the invention, a robotic arm, controlled by the control means, includes a means for storing a volume of the polymer-based composition as well as means for transporting said polymer to the extrusion head.

This means for storing a volume of the polymer-based composition is part of or included in the extrusion die, it being understood that this means may be located anywhere, either on the robotic arm or at a distance from the latter.

According to a first embodiment, the extrusion die is mounted at one end of the robotic arm.

According to a second advantageous embodiment, the extrusion die is mounted at a distance from the robotic arm such that only said extrusion head is moved to follow the continuous trajectory (see FIG. 10).

It may be noted here that the abovementioned equation is in no way modified whether in the first embodiment or the second embodiment (with the extrusion die offset relative to the robotic arm).

Advantageously, the polymer-based composition consists of a polymer matrix including at least 70% by weight, advantageously at least 95% by weight, of acrylonitrile butadiene styrene (ABS), polylactic acid (PLA polyester), polycarbonate (PC) or Polyethylene terephthalate (PET).

It may be noted here that the method according to the present invention applies to a large number of polymers or polymer mixtures.

According to a particularly advantageous aspect of the invention, the speed V of the extrusion die is based on the output extruded by the extrusion die.

Thus, according to an execution mode, the equivalent table of the extrusion die movement speed relative to the extruded polymer-based composition output may be established:

| Speed [mm/s] | | | Output |
|---|---|---|---|
| min | Nominal | max | [kg/h] |
| 100 | 130 | 160 | 13 |
| 60 | 80 | 100 | 8 |
| 30 | 50 | 60 | 5 |

Thus, preferably, the extruded bead comes out of the extrusion head with an output between five and fifteen kilos per hour, advantageously between eight and twelve kilos per hour.

Advantageously, the extruded bead has, at the extrusion head outlet, a viscosity between four hundred and four hundred and fifty Pascal per second (Pa·s−1) defined as per the ISO 11443 standard.

Advantageously, the temperature of the extruded bead, at the extrusion head outlet, is between 160° C. and 260° C., preferably between 200° C. and 240° C.

According to an aspect, the invention also relates to a method for producing a decorative object from at least one layer of an extruded bead of a polymer-based composition, including a step of passing a polymer-based composition into an extrusion die from a feed inlet of said composition to an extrusion head, from which an extruded bead of said composition comes out, the temperature of the extruded bead, at the extrusion head outlet, being between 180° C. and 260° C., characterized in that the extruded bead is deposited on a support for receiving the extruded bead layer by gravitational effect and in that the receiving support is heated to a heating temperature between 85° C. and 170° C. and in the receiving support is made of aluminum or of aluminum-based alloy, preferably of aluminum.

The applicant has results of comparative tests and trials making it possible to demonstrate the very particular benefit of aluminum or an aluminum alloy (see Table 1 hereinafter). The receiving support then has in particular a suitable mechanical adhesion function for the extruded bead.

The expression "heating temperature" means in relation to the receiving support that the latter has this temperature range on its upper surface, i.e. the surface in contact (or capable of being in contact) with the extruded bead.

Advantageously, the receiving support furthermore has a coating intended to allow a chemical adhesion of the extruded bead. This coating consists of a polymer coating, from a few microns (μm) to one or more millimeters (at most two millimeters). Preferably, this coating consists of a polyetherimide (PEI).

Preferably, the heating temperature is between 95° C. and 125° C. Such a temperature excludes at least one polymer included within the scope of the present invention—namely Polycarbonate described hereinafter as a possible example of polymer—but most of the polymers that can be used within the scope of the method and the device according to the invention are used with such a heating temperature range 95° C. to 125° C.

Advantageously, the decorative object comprises a plurality of extruded bead layers, each successive layer, after the first extruded bead layer, then forming the support for receiving the next extruded bead layer.

The invention also relates to a method for producing a decorative object from at least one layer of an extruded bead of a polymer-based composition, including a step of passing a polymer-based composition into an extrusion die from a feed inlet of said composition to an extrusion head, having an axis z'z, from which an extruded bead of said composition comes out, the extruded bead being deposited on a receiving support by gravitational effect, characterized in that the receiving support is presented in the form of a plate including at least one portion in relief, the extrusion head being controlled by control means and being orientable along the three axes and in that the extrusion head is continually oriented by the control means such that the axis z'z is perpendicular to the receiving support, including at the portion in relief.

The principle of the invention lies in that this axis z'z of the extrusion head is also located, throughout the process for producing the decorative object, perpendicular—that along an angle of 90°—with the receiving support, i.e. with the part of the support whereon the extruded bead has just been deposited by gravitational effect.

This subject matter of the invention is achieved firstly thanks to the extrusion head being orientable along the three axes—longitudinally, transversely and vertically—to follow exactly and precisely the surface of the support, including and above all at its portion in relief. As seen hereinafter, this subject matter is achieved additionally in that the receiving support is itself movable in translation, rotation and vertically. The extrusion head, like optionally the receiving support, is controlled by the control means.

Preferably, it should be noted here that, when the receiving support is fixed, resting horizontally (or at least one side of the relief extending horizontally), the extrusion head follows the contour of the relief—the relief portion of the support—perpendicularly up to a slope of the latter of at most 50°, this limit of 50° being included (the reliefs seen in FIGS. 5 to 8 have slopes less than) 50°. Thus, so that the extrusion head always follows the relief support perpendicularly at this/its relief, the receiving support is advantageously movably mounted so as to incline it preferably by an angle of at most 40°. In this way, the extrusion head is capable of following the receiving support perpendicularly regardless of the slope of its relief or its relief portion.

Nevertheless, if a means for cooling the extruded bead is used, such as in particular blowing the latter with inert gas and/or choosing a specific viscosity of the polymer-based composition, the maximum slope of the relief may be increased to almost 90°, while allowing perpendicular following of the extrusion head. Indeed, if the polymer bead sets rapidly when it comes out of the extrusion head, then the extrusion head may be used regardless of the slope of the relief or the relief portion, without requiring the receiving support to be angularly movable.

According to an option offered by the invention, it may be noted here that the receiving support may be independently movable from the extrusion head, the latter being capable of remaining immobile while the objective of having the extrusion head perpendicular to the surface of the receiving support is achieved.

Advantageously, the receiving support is movably mounted and controlled by the control means such that the axis z'z of the extrusion head is perpendicular to the receiving support.

According to another aspect, the invention relates to a method for producing a decorative object from at least one layer of an extruded bead of a polymer-based composition, including a step of passing a polymer-based composition into an extrusion die from a feed inlet of said composition to an extrusion head, having an opening diameter D, from which an extruded bead of said composition comes out, the temperature of the extruded bead, at the extrusion head outlet, being between 180° C. and 260° C., the method according to the invention being characterized in that the extruded head is located at a distance H between two and eight millimeters from a support for receiving the layer of the extruded bead, the extruded bead being deposited on the receiving support by gravitational effect, and in that the opening diameter D of the extrusion head is equal to H+/−1 millimeter.

The applicant carried out comparative tests showing that when D=+/−1 mm (millimeter), and only within the scope of this equation, optimum mechanical properties are obtained for the extruded bead of a layer of the decorative object. These tests comprise Young's Modulus and the elongation at break (ISO 527-1) as well as the Charpy V-notch test (ISO 179-1). The results of these tests are available from the applicant and are not provided here solely for the purposes of conciseness and clarity.

The sign "+/−" means "plus or minus". Thus, for example, if a distance H equal to five millimeters is considered, the diameter D of the extrusion head is between four and six millimeters, the upper and lower limits inclusive.

Thanks to this precise configuration of the distance, or the height, from the extrusion head to the receiving support, based on the opening diameter D of said extrusion head, an extruded bead having a uniform thickness or diameter throughout its length is obtained, said thickness of said diameter D being substantially equal to seven millimeters, plus or minus two millimeters, and a height of four millimeters, plus or minus two millimeters. Here and hereinafter, the expression "the distance from the extrusion head to the receiving support" means that this distance is considered from the lower end of the extrusion head to the upper surface, or the surface facing the extrusion head, of the receiving support.

Preferably, the distance H is between four and six millimeters, advantageously the distance H is equal to four millimeters.

Advantageously, the extrusion head moves at a speed between forty and one hundred and fifty millimeters per second, advantageously between sixty and one hundred millimeters per second.

According to one aspect relating to the decorative object, the production method comprises a step of equipping the extrusion head with a closing element movable between an open position allowing the bead to come out of said head and a closed position preventing the bead from coming out of said head. In other words, the production device including a closing element movable between an open position allowing the bead to come out of said head and a closed position preventing the bead from coming out of said head.

Preferably, to extrude a layer of level N in the first zone from a layer of level M in the second zone, such that M is greater than or equal to N+1, the following steps are carried out:

placing the closing element in the closed position after the end of the extrusion of the layer of level M in the second zone, moving the extrusion head from the second zone to an extrusion position located facing a layer of level N−1 of the first zone, the closing element being held in the closed position, when the extrusion head is positioned in the extrusion position of the first zone, placing the closing element in the open position and extruding the layer of level N by depositing it on the layer of level N−1 of said first zone.

BRIEF DESCRIPTION OF THE FIGURES

Further advantages and features of the invention will emerge more clearly on reading the description of a preferred embodiment hereinafter, with reference to the appended drawings, made by way of indicative and non-limiting examples and wherein:

FIG. 1 is a schematic view of a decorative object capable of being produced with the method and the device according to the invention.

FIG. 2 is a side view of the device for producing a decorative object from at least one extruded bead of a polymer-based composition according to the present invention.

FIG. 3 is an enlargement of part A present in FIG. 2, showing in particular the end of the extrusion head and the receiving support.

FIG. 4 is a top view of the device seen in FIG. 2.

FIG. 5 is a side view of another execution mode of the device for producing a decorative object from at least one extruded bead of a polymer-based composition according to the present invention wherein the receiving support, or at least a portion of said support, has a pyramidal relief.

FIG. 6 is another view of the device seen in FIG. 5 wherein the extrusion head is located on one side of the receiving support in relief.

FIG. 7 is a view of a device substantially identical to that seen in FIG. 5 wherein the receiving support have a hemispherical relief.

FIG. 8 is another view of the device seen in FIG. 7 wherein the extrusion head is located on one side of the receiving support in relief.

FIG. 9 is a side view of another execution mode of the device for producing a decorative object from at least one extruded bead of a polymer-based composition according to the present invention wherein the extrusion die is distant from the motorized arm, only a conduit conveying the polymer-based composition.

FIG. 10 is a diagram illustrating the variations of the distance D, here annotated as "deceleration distance", based on the angle $\alpha$ of the change of direction and the speed V according to the equation of the main subject matter of the present invention.

DETAILED DESCRIPTION OF THE EMBODIMENTS

The method and the device according to the invention make it possible to produce decorative objects. These decorative objects have a rigid structure serving most often as a support frame for a light installation, such as one or more string lights.

The control means include memory means for storing or saving on one hand the decorative object to be produced, layer by layer, and on the other the surface of the receiving support 20. These two items of information make it possible to define the precise trajectory of the extrusion head 51 to produce the decorative object.

Overall, the invention is broken down into two technical aspects.

When the receiving support 20 is planar or horizontal, a receiving support 20 consisting of an aluminum or an aluminum alloy is advantageously used and the receiving support 20 is heated to a specific heating temperature, as mentioned above. Some test results attesting to this invention are shown in Table 1 hereinafter.

When the receiving support 20 is in relief—hollow and/or bump/protuberance—or includes at least one portion in relief, the receiving support 20 is advantageously made of wood of a specific type and the receiving support 20 is not necessarily heated beyond ambient temperature. Some test results attesting to this invention are shown in Table 2 hereinafter.

The term "relief" in relation to the receiving support 20 means any portion of said support projecting on a planar surface wherein the receiving support 20 extends overall or generally. Thus, this relief may consist of a negative relief relative to this planar surface i.e. a hollow, a recess, a cavity or on the other hand a positive relief, i.e. a bump, a protuberance, a ridge.

Obviously, it is possible to provide a receiving support 20 which is partly made of aluminum or aluminum alloy, heated to a certain heating temperature, and partly in relief, this time made of wood of a specific type.

When the receiving support 20 is in relief or includes at least one portion in relief, a device 10 for producing a decorative object 1 from at least one extruded bead of a polymer-based composition will be envisaged, including:

an extrusion die 50 having at one end a feed inlet and at the other end an extrusion head 51, including a nozzle of axis z'z, said die 50 being supplied with at least one polymer-based composition coming out of the extrusion head 51 in the form of an extruded bead, the extruded bead has, at the outlet of the extrusion head 51, a viscosity between four hundred and four hundred and fifty Pascal per second defined as per the ISO 1144 standard, a receiving support 20 of the extruded bead is presented in the form of a plate, means for controlling and moving the extrusion die 50 and the extrusion head 51, a robotic arm, controlled by the control means, includes a means for storing a volume of the polymer-based composition as well as means for transporting said polymer to the extrusion head 51, characterized in that the receiving support 20 has at least one portion in relief and consists of wood having a Brinell hardness between 20 N·mm$^{-2}$ (Newton per square millimeter) and 30 N·mm$^{-2}$.

Advantageously, the receiving support 20 is made of laminated wood, assembled with a polymer resin.

Very advantageously, the receiving support 20 consists of birch.

In FIG. 1, the decorative object 1 consists of a stylized snowflake 2 set on a curl 3. For example, its length is between 50 centimeters (cm) and two meters whereas its width is between twenty centimeters and one meter. Concerning its thickness, a specificity of the present invention lies in that such a decorative object 1 or 2, 3 is formed from at least one extruded bead layer, optionally a plurality of extruded bead layers and these extruded beads all having a substantially identical thickness, between three and ten millimeters, preferably of the order—i.e. plus or minus one—of seven millimeters, and a height of four millimeters, preferably plus or minus one millimeter.

According to its single-layer or multi-nature layer, reference is made respectively to a two-dimensional (2D) or three-dimensional (3D) decorative object. Nevertheless, the term "relief" is used to mean that a layer—at least layer—does not extend along a plane since it includes at least one relief. Thus, a two-dimensional layer may have one or more reliefs whereas a multi-layer may only assemble layers without relief such that this multi-layer has no relief.

This decorative object 1 may be attached to a cable or attached to a post or a wall for an outdoor installation, for example in a street or on the front of a monument, or inside a home.

The decorative object 1 may incorporate one or more string lights, not seen in this appended figure.

FIGS. 2 to 9 endeavor to show the elements of the device 10 for producing a decorative object from at least one extruded bead of a polymer-based composition. These elements allow the implementation of the method according to the invention such that, within the scope of the present invention, a feature associated with the device 10 is applied to the method, and conversely.

This device 10 includes a support 20 for receiving the extruded bead. As can be seen in particular in FIGS. 2 to 4, in the example chosen here to illustrate the invention, this receiving support 20 is presented in an L shape, with two rectangular portions 21, 22 of substantially identical shape and dimensions extending perpendicularly in relation to each other. These two rectangular portions 21, 22 each form the end portions of the receiving support 20 whereas a square portion is disposed at the junction angle formed between these two end portions 21, 22. For example, the rectangular end portions 21, 22, has a length between fifty centimeters and two meters and a width between fifty centimeters and one hundred and fifty centimeters. The junction portion 23 is a square of a length between fifty centimeters and one hundred and fifty centimeters, considering that the width of the end portions 21, 22 is advantageously equal to the length of the side of the junction portion 23 such that the end edges of the receiving support 20 are continuous and essentially linear or rectilinear.

The choice of heating temperature of the support 20 for heating the extruded bead as well as its nature or its material were determined after multiple comparative trials and tests. Some of the results of these trials and tests are shown in Table 1 hereinafter.

When the receiving support 20 is planar or horizontal, then, as seen hereinafter, the receiving support 20 is advantageously heated, in a specific temperature range, and consists of aluminum or an aluminum alloy.

The first criterion sought is here the shrinkage which must be at most equal to 2% to comply with the invention. Hence, the test specimens tested not meeting this criterion of 2% shrinkage did not undergo the mechanical tests. Test results are shown in Table 1 hereinafter ("<" means "less than" and ">" means "greater than").

TABLE 1

| Receiving support (plate) | Bead | Heating temp | Shrinkage (%) | Young's Modulus (MPa) | Elongation at break (%) |
|---|---|---|---|---|---|
| Copper | ABS | 70° C. | >2 | — | — |
| | | 100° C. | 2< | 1400 | 15 |
| | | 200° C. | >2 | — | — |
| | PC | 70° C. | >2 | — | — |
| | | 100° C. | 2< | 2100 | 100 |
| | | 200° C. | >2 | — | — |
| | PLA | 70° C. | >2 | — | — |
| | | 100° C. | 2< | 2850 | 12 |
| | | 200° C. | >2 | — | — |
| Stainless steel | ABS | 70° C. | >2 | — | — |
| | | 100° C. | 2< | 1420 | 16 |
| | | 200° C. | >2 | — | — |
| | PC | 70° C. | >2 | — | — |
| | | 100° C. | 2< | 2150 | 105 |
| | | 200° C. | >2 | — | — |
| | PLA | 70° C. | >2 | — | — |
| | | 100° C. | 2< | 2900 | 12.1 |
| | | 200° C. | >2 | — | — |
| Brass | ABS | 70° C. | >2 | — | — |
| | | 100° C. | 2< | 1490 | 16 |
| | | 200° C. | >2 | — | — |
| | PC | 70° C. | >2 | — | — |
| | | 100° C. | 2< | 2180 | 111 |
| | | 200° C. | >2 | — | — |
| | PLA | 70° C. | >2 | — | — |
| | | 100° C. | 2< | 2980 | 12.1 |
| | | 200° C. | >2 | — | — |
| Cupronickel | ABS | 70° C. | >2 | — | — |
| | | 100° C. | 2< | 1490 | 16 |
| | | 200° C. | >2 | — | — |
| | PC | 70° C. | >2 | — | — |
| | | 100° C. | 2< | 2200 | 111 |
| | | 200° C. | >2 | — | — |
| | PLA | 70° C. | >2 | — | — |
| | | 100° C. | 2< | 2950 | 12.2 |
| | | 200° C. | >2 | — | — |
| Copper-Aluminum alloy | ABS | 70° C. | >2 | — | — |
| | | 100° C. | 2< | 1550 | 18 |
| | | 200° C. | >2 | — | — |
| | PC | 70° C. | >2 | — | — |
| | | 80° C. | 2< | 2250 | 110 |
| | | 200° C. | >2 | — | — |
| | PLA | 70° C. | >2 | — | — |
| | | 80° C. | 2< | 2960 | 12.3 |
| | | 200° C. | >2 | — | — |
| Aluminum | ABS | 70° C. | >2 | — | — |
| | | 80° C. | 2< | 1600 | 20 |
| | | 200° C. | >2 | — | — |
| | PC | 70° C. | >2 | — | — |
| | | 80° C. | 2< | 2300 | 120 |
| | | 200° C. | >2 | — | — |
| | PLA | 70° C. | >2 | — | — |
| | | 100° C. | 2< | 3020 | 12.6 |
| | | 200° C. | >2 | — | — |

The shrinkage criterion is considered, optionally with a slight structural adjustment, as per the ISO 294 standard. The ISO 527-1 standard is considered for determining the Young's Modulus and the elongation at break. ABS: Acrylonitrile butadiene styrene; PC: Polycarbonate and PLA: polylactic acid polymer.

Firstly, thanks to the application of a heating temperature in the range from 85° C. to 140° C., preferably from 95° C.

to 125° C., extruded beads having a low shrinkage and satisfactory, or very satisfactory, mechanical properties are obtained. If the fact that the receiving support 20 is made of aluminum, or of an aluminum alloy, is added to this first essential feature, then the shrinkage/mechanical results are improved further and a decorative object that is readily detachable, without damage, from the receiving support 20 is obtained.

When the receiving support is in relief or has at least one relief, protuberance or hollow, then the applicant is advantageously made of class B wood according to the Brinell hardness, as can be seen in Table 2 hereinafter.

Within the scope of the invention, for better or perfect processability of one or more layers based on polymer composition, it is sought to obtain a roughness result less than 3.2 μm (micrometer), preferably less than 1.6 μm, a thermal conductivity result to be completed and a thermal expansion result of at most to be completed.

TABLE 2

| Receiving support (type) | Roughness (in μm) | Thermal conductivity ($W \cdot m^{-1} \cdot K^{-1}$) | Thermal expansion ($K^{-1}$) |
|---|---|---|---|
| Steel | 0.8 | 52 | $12.0 \times 10^{-6}$ |
| | 1.6 | 50 | |
| | 3.2 | 46 | |
| | 6.3 | 42 | |
| Aluminum | 0.8 | 230 | $23.0 \times 10^{-6}$ |
| | 1.6 | 205 | |
| | 3.2 | 198 | |
| | 6.3 | 187 | |
| Ceramic (stoneware) | 0.8 | 3.5 | $7.0 \times 10^{-6}$ |
| | 1.6 | 3.2 | |
| | 3.2 | 3.0 | |
| | 6.3 | 2.6 | |
| Wood (walnut) | 0.8 | 0.23 | $6 \times 10^{-6}$ |
| | 1.6 | 0.21 | |
| | 3.2 | 0.18 | |
| | 6.3 | 0.15 | |
| Wood (birch) | 0.8 | 0.20 | $5 \times 10^{-6}$ |
| | 1.6 | 0.19 | |
| | 3.2 | 0.17 | |
| | 6.3 | 0.16 | |
| Laminated wood (birch) | 0.8 | 0.15 | $3.5 \times 10^{-6}$ |
| | 1.6 | 0.14 | |
| | 3.2 | 0.12 | |
| | 6.3 | 0.11 | |

The roughness criterion is considered, optionally with a slight structural adjustment, as per the ISO 4287 standard. The EN 12939 standard is considered for determining the thermal conductivity. The ISO 11359 standard is considered for the thermal expansion or linear thermal expansion coefficient.

Four types of polymers were used in the context of Table 2 above, namely ABS: Acrylonitrile butadiene styrene; PC: Polycarbonate and PLA: polylactic acid polymer; PET: Polyethylene Terephthalate.

It should also be noted that some class C woods of Brinell hardness between 30 $N \cdot mm^{-2}$ and 40 $N \cdot mm^{-2}$, such as beech or acacia, displayed relatively satisfactory results on the aforementioned technical criteria but these woods are too expensive and more difficult to machine, which makes them unfit for this industrial use.

This receiving support 20 has a thickness between five millimeters and thirty millimeters. Additional functions of this receiving support 20 consist of receiving the extruded bead without the latter adhering to the receiving support 20, or obviously being deformed or degraded by the latter.

Considering this receiving support 20, an important aspect lies in its location around the robotic arm 30, or at least in part around this robotic arm 30. Thus, here the receiving support 20 has a general L shape, the robotic arm 30 being located in the vicinity of the junction portion 23 substantially at equal distance from the end portions 21, 22. It may also be provided that the receiving support 20 be in the general form of a square or circular frame surrounding the robotic arm 30, the latter 30 being completely surrounded or encircled by the receiving support 20. Finally, the receiving support 20 may have a general I shape or a general U shape with three sides surrounding the robotic arm 30.

The receiving support 20 is mounted on a raising base 40, for example made of metal such as a steel or of wood, which makes it possible to place the receiving support 20 at a height from ground level between twenty centimeters and one meter, so as to adapt to the dimensions of the robotic arm 30 and facilitate the gripping and handling of the decorative object 1 produced on the receiving support 20.

The means for controlling and moving the extrusion die 50 consist for one part of the robotic arm 30. This robotic arm 30 comprises two sections, a first section 31 extending from the base 32 of the robotic arm 30 and a second section 33 extending following on from the first section 31, this second section 33 carrying or attaching at its free end the distal portion 34, acting as an arm, on which the extrusion die 50 is mounted and attached. The first section 31 of the robotic arm 30 is mounted free in rotation on the part acting as a base 32 of the robotic arm 30 and may also be oriented transversely to be disposed facing a portion 21, 22 or 23 of the receiving support 20. Thus, this first section 31 of the robotic arm 30 is capable, in the example chosen to illustrate the invention, of being oriented transversely along an angle of at least 180°, given that the receiving support 20 forms an L.

The robotic arm 30 is attached to a base structure 35 intended to hold it and stabilize it.

The second section 33 of the robotic arm 30 is also mounted free in rotation, at its end near the first section 31, whereas it 33 carries at its other end the distal portion 34 on which the extrusion die 50 is mounted and attached. Unlike the first section 31, this second section 33 does not have any possibility of transverse orientation and obviously follows any movement of the first section 31.

The links between the first section 31 and the base 32, between the first section 31 and the second section 33, between the second section 33 and the distal portion (or arm) of the robotic arm 30 form the hinges of the latter.

Actuation means, such as cylinders and/or rotary motors, disposed at these hinges ultimately make it possible to produce translation and optionally rotation movements of the extrusion die 50.

The dimensions of the first and the second sections 31, 33 are adapted to the use of the robotic arm 30, i.e. to the production of the decorative object 1 on the receiving support 20.

The extrusion die 50 is a conventional extrusion die which is in no way modified within the scope of the present invention, except for at the opening diameter D of its extrusion head 51 which is linked with the distance or the height H at which this extrusion head 51 is found or is located of the surface of the receiving support 20. It must be noted here that FIG. 3 does not have any limiting or restrictive nature in terms of the dimensioning of the values D and H such that no dimensional value, or value ratio, can be inferred from this figure. Obviously, when the production method according to the invention is envisaged to produce a multi-layer decorative object 1, i.e. by superposing a plurality of extruded beads placed on top of each other, the surface of the last layer of extruded beads forms the receiving support 20. Hence, in the latter case, the distance H is no longer that between the receiving support 20 and the extrusion head 51 but the distance or the height, still denoted H, between the upper surface of the extruded bead and the extrusion head 51.

Considering the extrusion die 50, the opening diameter D of the extrusion head 51 may be fixed or variable, according to options well-known in the technical field but obviously, this opening diameter D being generally constant during the extrusion time of the bead to form the decorative object 1. In the hypothesis where this opening diameter D is variable or different during the production of the decorative object 1, the ratio defined within the scope of the present invention between the lengths H and D still remains valid. Thus, if D was modified during the production of a decorative object 1 according to the invention, then H is modified accordingly.

The means for controlling and moving the extrusion die 50 moreover comprise an electronic control unit, not represented in the appended figures. The movements of the robotic arm 30 are controlled by this electronic control unit. The electronic control unit is presented in particular in the form of a laptop or desktop computer, provided in particular with a processor, microprocessor or CPU (Central Processing Unit) and a memory, wherein a program is recorded, of which the instructions, when they are run by the processor, microprocessor or CPU, make it possible to control the movement of the extrusion die 50 spatially. This electronic control unit also manages the extrusion die 50, i.e. in particular the supply of polymer-based composition and the extrusion output.

The term "program" may be understood as: computer application, computer programs or software. For the purposes of clarity, according to the invention, "the robotic arm does something" should be understood to mean "the program run by the processor, microprocessor or CPU of the electronic control unit does something".

The movement of the extrusion die 50 along a predefined trajectory makes it possible to produce a decorative object 1 by depositing material, for a single-layer decorative object, or by adding material (additive manufacture) by stacking in layers of extruded beads. These layers of extruded beads may be stacked on top of each other and/or optionally side by side. Stacking the layers of extruded beads creates the volume of the decorative object 1 even if such an object 1 having a single-layer bead already has a thickness of at least several millimeters. The trajectory of the extrusion die 50 along the longitudinal, axial and optionally vertical axes, i.e. along three mutually perpendicular directions, makes it possible to produce all types of contours and curves of the desired decorative object 1.

In practice, a designer draws the desired decorative object 1 thanks to a computer-aided design (CAD) tool. The file obtained is processed by the program saved in the memory of the electronic control unit according to the equation according to the present invention. The robotic arm 30 is controlled according to this equation such that the extrusion die 50 deposits the bead layer by layer, if needed, until the final decorative object 1 is obtained. The decorative object 1 is thus obtained rapidly, precisely and with an optimal repeatability.

FIGS. 5 to 8 more specifically illustrate the invention when it is sought to produce a decorative object in relief or having at least one portion in relief. To do this, at least one corresponding portion of the receiving support 20 has a relief which forms, by applying the extruded bead, said decorative object.

As can be seen in these figures, this relief may consist for example of a pyramid (see FIGS. 5 and 6) or a hemisphere (see FIGS. 7 and 8) but may obviously come in any shapes. It may be noted here that these reliefs advantageously have a planar face so as to be positioned easily on a support, preferably on a planar or horizontal part of the receiving support 20. Thus, it may also be envisaged that the receiving support 20 in relief has no planar surface but obviously, in this case, this receiving support 20 in relief is held by an arm or similar. In this hypothesis, this arm or similar holding the receiving support 20 in relief is advantageously movable such that the extrusion head 51 follows the surface perpendicularly more easily.

FIG. 9 illustrates an embodiment wherein the extrusion die 50 is disposed at a distance from the robotic arm 30, which makes it possible to lighten the latter 30 and thus facilitate the movements of the extrusion head 51. Ideally, as illustrated in this figure, the extrusion die 50 is disposed in the vicinity of the control means or a part of said control means of the device 10 according to the invention.

According to another alternative embodiment, the extrusion head 51 is fixed and the support 20 is moved. In this case, the support 20 is secured to a movement means such as a robotic arm 30 or carriage 8 cited above, the movement of said plate being controlled by the control unit.

Although the invention has been described with reference to several particular embodiments, it is obvious that it is in no way limited thereto and that it comprises any technical equivalents of the means described as well as their combinations if they fall within the scope of the invention.

The arrangement of the different elements and/or means and/or steps of the invention, in the embodiment described above, should not be understood as requiring such an arrangement in all the implementations. Various variants may be provided, and in particular:

the shape and the dimensions of the support 20 for receiving the extruded bead are variable, based on the decorative object 1 to be produced but above all based on the arrangement and the dimensions of the robotic arm 30, the greater the latter are, the more varied and greater the dimensions of the receiving support 20 may be, the robotic arm 30 may have as many sections 21, 22, 23 as required or useful for producing the decorative object 1. Similarly, the shape and the degree of freedom of the robotic arm 30 are variable for all that they offer the option to bring the extrusion head 51 to the desired height of the receiving support 20, accounting for the opening diameter D of the extrusion head 51. It may also be provided to have a plurality of robotic arms 30 and as many extrusion heads 51 optionally distant from each of said arms, for example at least two robotic arms 30 working together to produce a decorative object 1 according to the invention.

The use of the verb "contain", "comprise" or "include" and its conjugated forms does not rule out the presence of other elements or other steps than those stated in a claim.

In the claims, any reference sign between parentheses should not be interpreted as a limitation of the claim.

The invention claimed is:

1. A method for producing a decorative object from at least one layer of an extruded bead of a polymer-based composition, comprising a step of:

passing a polymer-based composition into an extrusion die from a feed inlet of said extrusion die to an extrusion head from which an extruded bead of said composition comes out, the extrusion bead being deposited on a receiving support by gravitational effect;

wherein the extrusion head is controlled by control means to follow a continuous trajectory intended to form said decorative object in one layer, said control means controlling a variation in a speed V of movement of the extrusion head on the basis of a variation in the trajectory of the extrusion head by an angle α; and wherein, at a distance D from a change in angle α, the continuous trajectory of the extrusion head complies with the following equation, for each of the layers forming the decorative object:

$$D = a + (b \times Vc) + (d \times \alpha)$$

where a, b, c and d are constants according to the following values:

a=10.6±10%, b=2.76$^{-05}$±10%, c=2.72±10%, and d=−0.08±10%, where D is expressed in millimeters, V is expressed in millimeters per second, and α is expressed in degrees.

2. The method according to claim 1, wherein the constants a, b, c and d are expressed according to the following values:

a=10.6±5%, b=2.76$^{-05}$±5%, c=2.72±5%, and d=−0.08±5%.

3. The method according to claim 2, wherein a robotic arm, controlled by the control means, includes a means for storing a volume of the polymer-based composition as well as means for transporting said polymer-based composition to the extrusion head.

4. The method according to claim 3, wherein the extrusion die is mounted at one end of the robotic arm.

5. The method according to claim 3, wherein the extrusion die is mounted at a distance from the robotic arm such that only said extrusion head is moved to follow the continuous trajectory.

6. The method according to claim 1, wherein the polymer-based composition comprises a polymer matrix including at least 70% by weight of acrylonitrile butadiene styrene (ABS), polylactic acid (PLA polyester), polycarbonate (PC) or Polyethylene terephthalate (PET).

7. The method according to claim 1, wherein the speed V of the extrusion head is based on a flow rate output extruded by the extrusion die.

8. The method according to claim 1, wherein the extruded bead comes out of the extrusion head with an output between five and fifteen kilograms per hour.

9. The method according to claim 1, wherein, at an outlet of the extrusion head, the extruded bead has a viscosity between 400 Pa·s and 450 Pa·s, defined as per the ISO 11443 standard.

10. The method according to claim 1, wherein, at an outlet of the extrusion head, the temperature of the extruded bead is between 160° C. and 260° C.

* * * * *